W. H. BRISTOL & H. KOESTER.
THERMOSTAT.
APPLICATION FILED JUNE 11, 1915.
1,225,758.  Patented May 15, 1917.
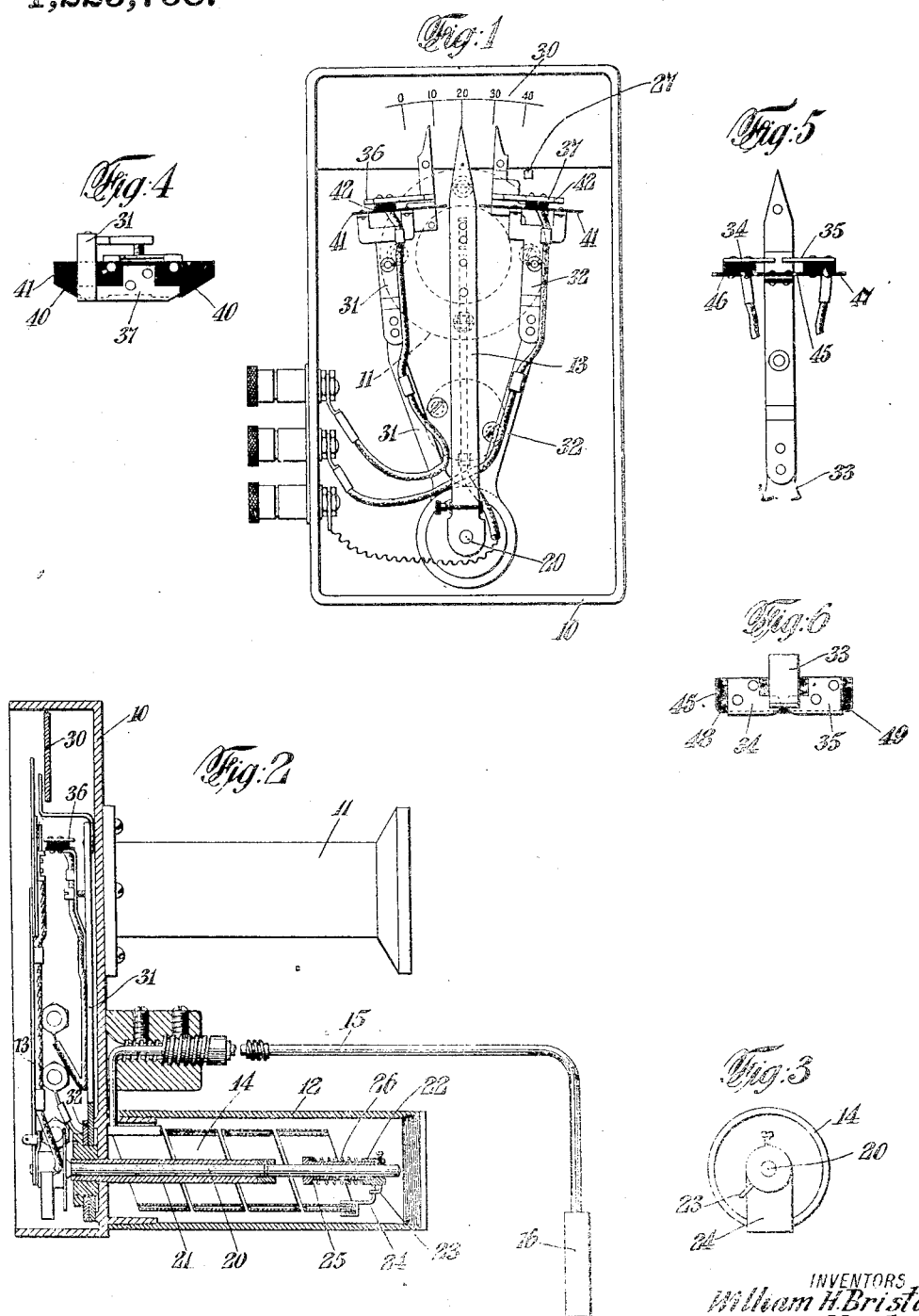
INVENTORS
William H. Bristol
Herman Koester
BY Fredk F. Schuetz
ATTORNEY

2. # UNITED STATES PATENT OFFICE.

WILLIAM H. BRISTOL AND HERMAN KOESTER, OF WATERBURY, CONNECTICUT, ASSIGNORS TO THE BRISTOL COMPANY, OF WATERBURY, CONNECTICUT, A CORPORATION OF CONNECTICUT.

THERMOSTAT.

1,225,758.  Specification of Letters Patent.  Patented May 15, 1917.

Application filed June 11, 1915. Serial No. 33,522.

*To all whom it may concern:*

Be it known that we, WILLIAM H. BRISTOL and HERMAN KOESTER, citizens of the United States, and residents of Waterbury, in the county of New Haven and State of Connecticut, have invented certain new and useful Improvements in Thermostats, of which the following is a specification.

The invention relates to measuring instruments and to automatic regulating apparatus, as for example, apparatus of this character employing electrical contact making means operated through the instrumentality of certain external conditions. It has for its object to provide improved contact making means, and to so construct the actuating mechanism therefor that the size of the instrument may be considerably reduced without subjecting its calibrated actuating mechanism to undue stress. This latter feature is effected by positively confining the movement of the contact member or pointer to the particular range desired while permitting the said actuating mechanism therefor to continue its movement substantially freely beyond the confined position of the said pointer.

In the accompanying drawings, which illustrate the invention as applied to a thermostat—

Figure 1 is a front elevation thereof.

Fig. 2 is a vertical section therethrough.

Fig. 3 is an end view of the actuating mechanism for the contact making member or pointer.

Fig. 4 is a detail plan of the contact device.

Figs. 5 and 6 are fragmentary detail views respectively in elevation and plan illustrating a modification.

Similar characters of reference designate corresponding parts throughout the several views.

Referring to the drawings, 10 designates a casing for the mechanism and is provided with suitable attaching means, as the bracket 11. A rearwardly extending casing 12 is also provided to contain the mechanism for actuating the contact making member or pointer 13; and the said mechanism, as herein shown, consists of a flat helically wound tube 14 communicating with a capillary tube 15 extending to the point at which the controlling temperature prevails. The said capillary tube itself terminates in a bulb 16 for exposure to the temperature, all of which is old and well known and forms no part of the present invention. Heretofore, the movement of the pointer 13, as derived from the movement of tube 14 which is under the influence of the temperature to which the bulb 16 is exposed, has been unrestricted over the entire range of temperature variation for which the instrument is designed.

The present invention relates more particularly to means whereby the actual range of movement of the contact making member or pointer 13 may be restricted and contracted to the actual working range desired, thereby considerably reducing the size of the instrument, particularly in width. It will be evident, that such restriction of the movement of the pointer must not cause the actuating mechanism to be subjected to undue stress, as otherwise the instrument would suffer in accuracy. To this end, a spindle 20, mounted for oscillation in a sleeve 21, is rigidly connected to the pointer 13 and the outer end of said spindle passes through a collar 22 to which the outer free end of the flat tube 14 is rigidly secured. This will permit the said coiled tube 14 to wind and unwind freely without influencing the spindle 20 and its attached pointer 13. To cause the spindle to respond to the movement of the coiled tube 14, a pin 23 is arranged to extend inwardly from the outer end of the said spindle and to engage with a bracket 24 which serves also to connect the free end of the said tube to the collar 22. To the spindle is secured, furthermore, a bushing 25 which moves within the collar 22 and has secured thereto and coiled about itself one end of a spring 26 whose other end is fixed to the collar 22, the spring being so tensioned as to urge the pin and with it the spindle toward the bracket 24. The former will thus follow the rotation of the bracket in that particular direction until its rotation is arrested by contact of the said pointer with a stop 27 of the casing 10. The tube 14, however, is free to continue its movement, leaving the pin 23 and spindle 20 behind and which remain under the comparatively slight tension of the coiled spring 26 only. On the return movement, the bracket 24 will pick up the pin 23; and the continued movement of the coiled tube 14 in this direction will be substantially unrestricted, the tube merely carrying the spindle 20 and the bushing 25 with it. No stop is, as a rule, required for the return movement which may extend to the lowest range that the instrument is likely to be used for. Movement in one direction of the contact arm or pointer is thus positively restricted to the desired limit, for example as shown in Fig. 1, over a scale 30 ranging from 0° to 40°. This is effected, as set forth, without impairing the accuracy of the actuating tube 14 as would result from subjecting the same to an undue stress which would ordinarily occur were the instrument exposed to the usual temperatures—for example in shipping the instrument. It is to be noted, moreover, that the calibration of the tube 14 is in no way affected until the end of the working portion of the scale is reached, that is to say when the pointer 13 comes into contact with the stop 27.

The outer end of the contact making arm 13 is designed to move over the terminals of two contact carrying arms 31 and 32 which are adjustably mounted and held by friction coaxially with the pointer 13 and may be set to the desired extremes of temperature between which the regulation is to be effected. Or, as shown in Figs. 5 and 6, a single contact carrying arm 33 similarly mounted may be arranged to carry two fixed contacts 34 and 35, so that although a variation of the particular regulated temperature is possible, yet the actual limits within which this control is effected is positively restricted to the fixed interval represented by the distance between the two said contacts 34 and 35. With the arrangement of contacts shown in Fig. 1, each of the contacts 36 and 37 is individually adjustable, whereby the interval or limits in which the regulation is to be effected may be varied.

The contacts actually employed possess certain novel features which insure a more positive contact and reduce to a large extent rapid deterioration thereof through burning. For this purpose, the contact making pointer 13 is designed to first engage with beveled edges 40 (Fig. 4) of an insulating strip 41 which is located adjacent to the actual and shorter contact pieces 36 or 37 being separated a slight distance therefrom, as by means of a block of insulation 42. The edge of an insulation piece 41 projects slightly beyond the corresponding edge of the contacts 36 or 37 so that after the arm 13 rides up on the beveled edge 40 it will suddenly make contact with the said edge of the contact pieces 36 and 37. It will, also, be positively held thereto under the spring tension of said arm; and, thereby, as well as in leaving the contacts, excessive sparking between contacts and pointer is obviated. In the modification illustrated in Figs. 5 and 6, the two contact pieces 34 and 35 are carried by a single strip of insulating material 45, being separated therefrom by respective blocks 46 and 47. Suitable beveled edges 48 and 49 are provided at the ends of the insulation piece, and the edge of the said insulation piece projects slightly beyond the corresponding edges of the said contacts.

We claim:—

1. In a measuring instrument: a measuring member; contacts to coöperate therewith; a spindle attached to the measuring member; an actuating member rotatably mounted on said spindle; resilient means carried by said spindle to engage said actuating member; and means to restrict the range of movement of the measuring member in one direction.

2. In a measuring instrument: a tensioned measuring member; an actuating member therefor rotatably mounted with respect to said measuring member and free to leave same in one direction of rotation; means carried by one of said members to be engaged by the other to actuate the measuring member in one direction; means to restrict the range of movement of the measuring member in the opposite direction; and means to cause said measuring member to follow said actuating member in this direction to a predetermined extent, the said actuating member being free to continue its movement in said direction beyond the point of restriction.

3. In a measuring instrument: a measuring member; a spindle attached thereto; an actuating member rotatably mounted on said spindle; resilient means carried by said spindle to engage said actuating member; and means to restrict the range of movement of the measuring member in one direction.

4. In a measuring instrument: a measuring member; a spindle attached thereto; an actuating member rotatably mounted on said spindle; a pin extending from said spindle to engage said actuating member; a bushing movable with said spindle; a collar mounted about said bushing and attached to said actuating member; a coiled spring about said bushing, one end of which spring is fixed to said collar and the other to said bushing; and means to restrict the range of movement of the measuring member in the direction in which the spring tends to urge the same.

5. A thermostat, comprising: suitable adjustable contacts and each including two parallel strips, the inner one of insulating material being the longer, having beveled ends and its edge projecting beyond the corresponding edge of the other and conducting strip; a resilient contact making member adapted to first ride upon said insulating strip and then upon said conducting strip to make contact with the latter; means to actuate said contact making member; and means to restrict the range of movement of the same, said actuating member being adapted to continue its movement beyond the point of restriction without transmitting the same to said contact making member.

Signed at Waterbury, in the county of New Haven, and State of Connecticut.

WILLIAM H. BRISTOL.
HERMAN KOESTER.